United States Patent [19]
Lee

[11] Patent Number: 5,854,725
[45] Date of Patent: Dec. 29, 1998

[54] AIR FLOW GUIDE FOR REDUCING AIR FLOW DISTURBANCE ON AN ACTUATOR ARM OF A HAND DISK DRIVE AND A PROCESSING METHOD THEREFOR

[75] Inventor: Joo-Shik Lee, Seoul, Rep. of Korea

[73] Assignee: SamSung Electronics Co., Ltd., Suwon, Rep. of Korea

[21] Appl. No.: 677,030

[22] Filed: Jul. 8, 1996

[30] Foreign Application Priority Data

Jul. 8, 1995 [KR] Rep. of Korea ................... 1995-20116

[51] Int. Cl.⁶ ............................. G11B 5/55; G11B 21/08
[52] U.S. Cl. .......................................................... 360/106
[58] Field of Search ..................................... 360/106, 104

[56] References Cited

U.S. PATENT DOCUMENTS

| | | | |
|---|---|---|---|
| 4,175,275 | 11/1979 | Schaefer | 360/104 |
| 4,189,759 | 2/1980 | Bauck et al. | 360/104 |
| 4,821,130 | 4/1989 | Bernett | 360/78.04 |

*Primary Examiner*—John H. Wolff
*Attorney, Agent, or Firm*—Robert E. Bushnell, Esq.

[57] ABSTRACT

An actuator device of a hard disk drive for reducing a disturbance affecting an actuator. The actuator device has a guide unit connected or attached to an actuator arm for reducing a disturbance affecting the actuator, caused by an air flow generated from a surface of the disk during disk rotation. The guide unit maintains a laminar flow of air between the disk and the actuator arm as the disk is rotated by a spindle of the hard disk drive.

20 Claims, 5 Drawing Sheets

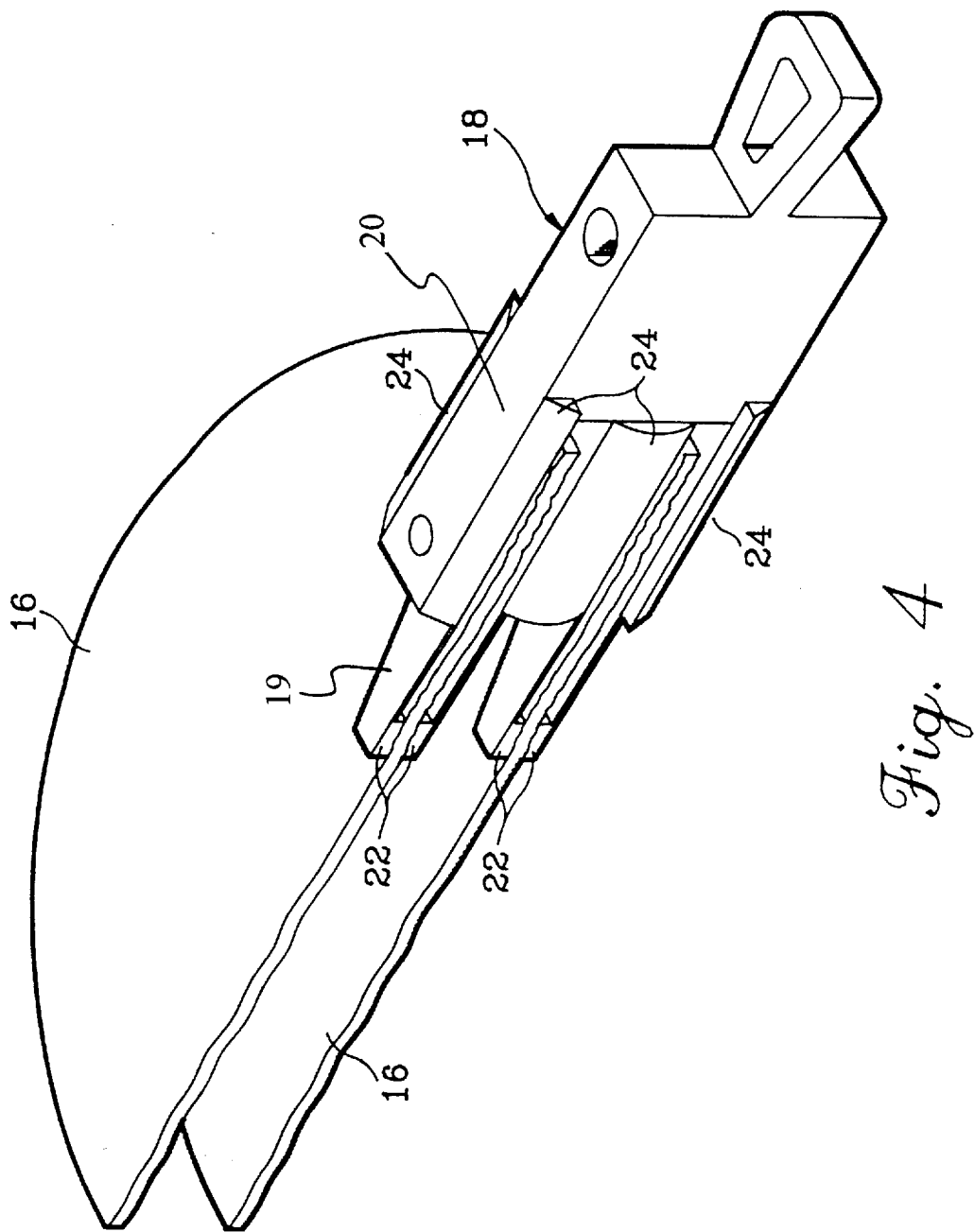

AIR FLOW GUIDE FOR REDUCING AIR FLOW DISTURBANCE ON AN ACTUATOR ARM OF A HAND DISK DRIVE AND A PROCESSING METHOD THEREFOR

CLAIM OF PRIORITY

This application makes reference to, incorporates the same herein, and claims all benefits accruing under 35 U.S.C. §119 from an application entitled An Actuator Device Of A Hard Disk Drive And A Processing Method Therefor earlier filed in the Korean Industrial Property Office on 8 Jul. 1995, which was duly assigned Ser. No. 20116/1995 by that Office.

BACKGROUND OF THE INVENTION

1. Field of the Invention

The present invention relates to a hard disk drive, and more particularly to an actuator device of a hard disk drive for reducing air friction.

2. Description of the Related Art

A conventional hard disk drive is provided with a spindle motor rotating at a certain speed, and a disk rotates as a recording medium by the spindle motor. Actuator heads fly over the corresponding base surfaces of disks, and are normally spaced apart from those surfaces by a hydrodynamic air bearing formed by a cushion of air generated by the rapid rotation of the disks. The actuator arm is rectangular, thus, air flow, generated on a surface of disks, affects the body of the actuator arm. Accordingly, in a conventional hard disk drive, when the head of the actuator is moved to read or write data on a disk, while the disk is being rotated by the spindle motor, the actuator arm is vibrated by the flow of air. In other words, air flow operates as a disturbance upon actuator, thereby disturbing a servo system of hard disk drive. Here, the disturbance is a windage generated by wind power upon the actuator arm, and a change in the wind power is generated by a turbulent flow at a back portion and a front portion of actuator arm. By such disturbance of the servo system, there has been a problem in which it is difficult to control the position of head of the actuator on the disk, thereby reducing the performance of hard disk drive.

One early effort in the art, represented by U.S. Pat. No. 4,821,130 to Frank Bernett and entitled Disk Extender Baffles, discusses a device for reducing the vertical vibratory motion of an actuator arm by using baffle plates spaced a predetermined distance from the edge of the disks to help maintain parallel air flow across the edge of each disk thereby reducing at the disk edge which in turn reduces the horizontal or cross-track motion of the head. Bernett device endeavors to correct for turbulent air flow at the edge of the disk, but does not correct for the air flow generated on the surface of each disk causing vibrations of the actuator arm due to the turbulence generated at the back portion and front portion of the actuator arm.

SUMMARY OF THE INVENTION

It is therefore an object of the invention to provide an actuator device of a hard disk drive for reducing disturbances affecting movement of an actuator.

It is another object of the invention to provide an actuator device for reducing turbulent air flow generated at the back portion and front portion of an actuator arm.

It is still another object to provide a disk drive able to more accurately read and write data from a rotating disk.

To achieve this and other objects, the present invention provides a guiding unit attached to the actuator of a hard disk drive, wherein the guiding unit has a streamline shape or tapered shape to thereby reduce a disturbance, which is caused by an air flow generated from a surface of a rotating disk, affecting the actuator.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 is a perspective view partially illustrating an actuator device of a hard disk drive constructed according to the principles of the present invention.

DETAILED DESCRIPTION OF THE PREFERRED EMBODIMENT

Figure 1:
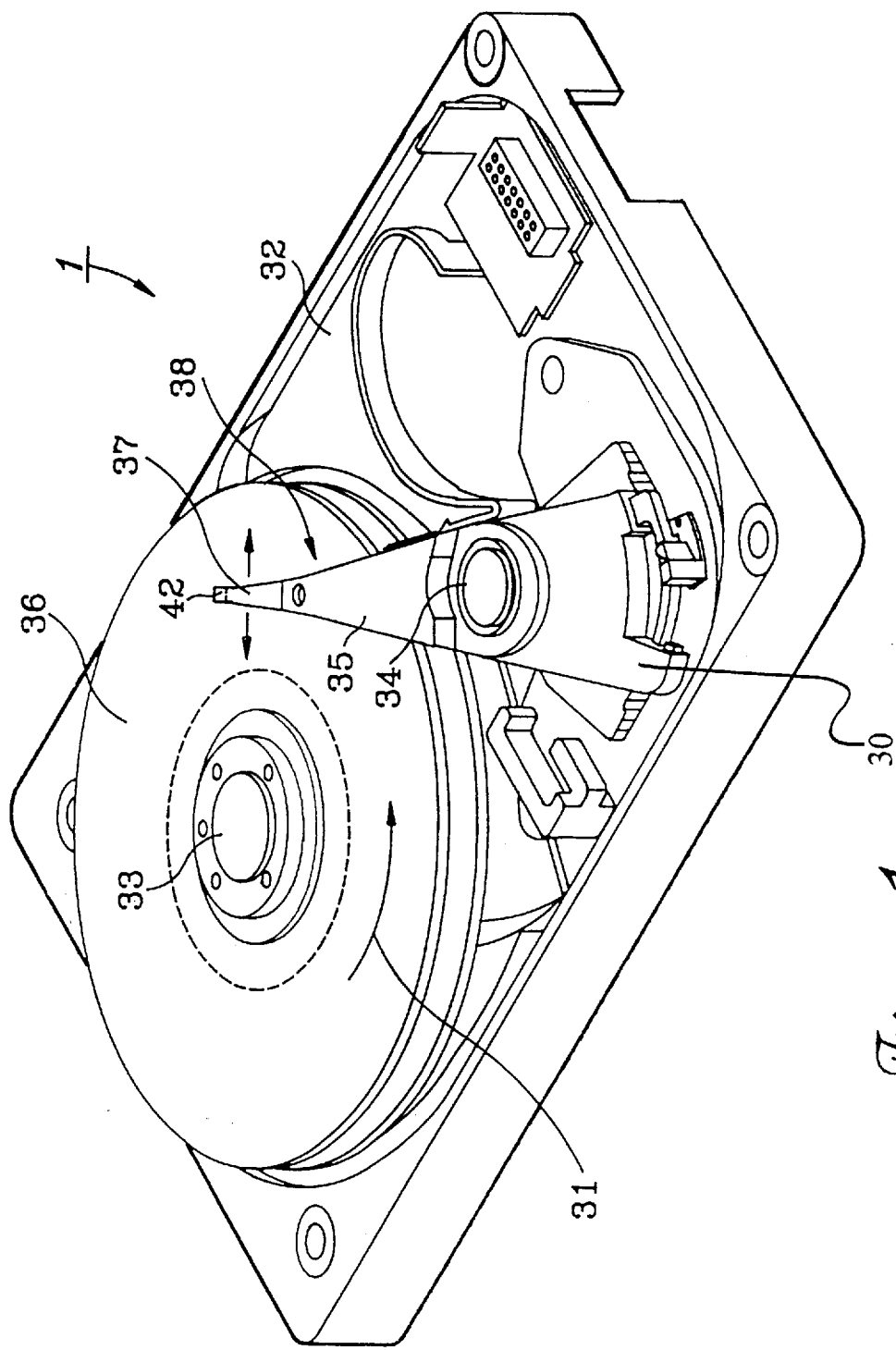
FIG. 1 is a perspective view illustrating the construction of a hypothetical composite representing a conventional actuator device of a hard disk drive.

Turning now to the drawings, and referring to FIGS. 1 and 2A–2C, hard disk drive 1, suitable for use with a microcomputer, is constructed with a generally, rectangularly shaped base 32 serving as a frame providing a major interior surface accommodating a plurality of circular disks 36 coaxially mounted in a stack upon a spindle 33 driven by a motor (not shown) mounted on base 32 to provide a plurality of cylindrical base surfaces that serve as a memory into which binary information may be written and read. An actuator 38, mounted upon base 32 by a pivot 34, freely rotates about the longitudinal axis of pivot 34 as controlled by a voice coil motor 30 positioned to respond to electrical control signals and thereby arcuately displace a proximal end of actuator arm 35. Actuator arm 35 supports a head gimbal 37 at its distal end which, in turn, supports a plurality of electromagnetic transducers commonly known as read/write actuator heads 42 for reading and writing data on disks 36. Typically, the base surfaces of disks 36 are coated with a magnetically sensitive material that responds to fields created by corresponding ones of actuator heads 42, to enable actuator heads 42 to either write bits of information at selected locations along tracks formed on the surface of the disk, or to read information from those tracks. Generally, disk 36 continuously rotates in a single direction while voice coil motor 30 acts upon the proximal end of actuator arm 35 to arcuately displace the proximal end relative to motor 30 and thereby cause the distal ends of actuator arm 35 to radially position heads 42 along corresponding base surfaces of disks 36 to read or write data thereto.

Voice coil motor 30 drives the proximal end of actuator arm 35 to move heads 42 to a data free parking or landing zone of the disks upon which heads may rest without destroying information stored on the disks, when electrical power is turned off. Typically, actuator arm 35 quickly moves heads 42 to the parking zone in case of error or loss of power, and generally a crash stop is provided to block the proximal end and thereby limit further movement of actuator arm 35 once heads 42 reach their stop position within the parking zone.

Figure 2A:
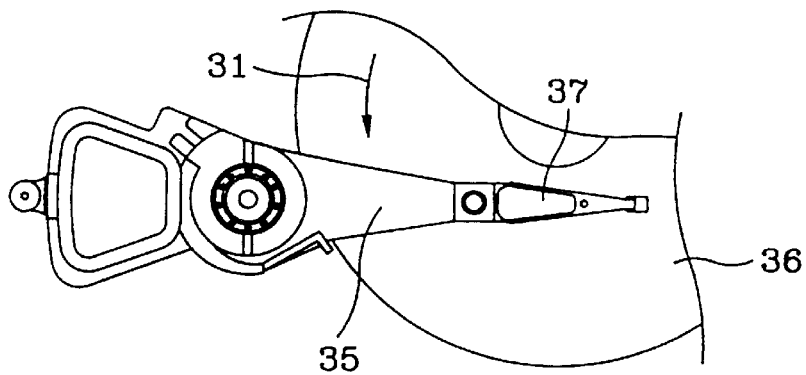
FIG. 2A is a view illustrating an actuator device affected by an air flow which is generated when a disk having the design represented by FIG. 1 is rotated at a high speed.
Figure 2B:
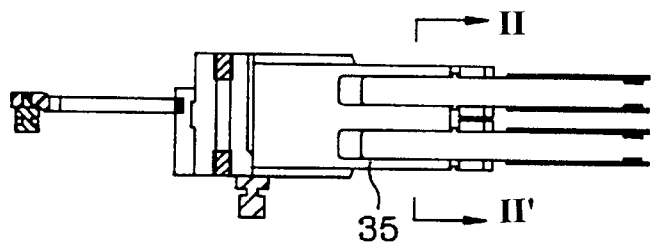
FIG. 2B is a side view illustrating the actuator device of FIG. 2A.
Figure 2C:
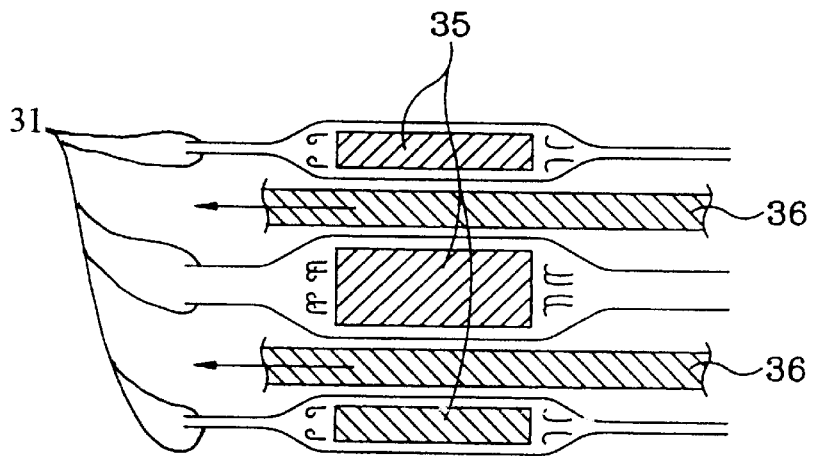
FIG. 2C is a sectional view according to line II—II of FIG. 2B.

As shown in FIG. 1 and FIG. 2A, a conventional hard disk drive 1 is provided with a spindle motor 33 assembled to a base 32 and rotates at a certain speed, and a disk 36 is rotated as a recording medium by the spindle motor 33. Actuator heads 42 "fly" over the corresponding base surfaces of disks 36, and are normally spaced apart from those surfaces by a hydrodynamic air bearing formed by a cushion of air 31 generated by the rapid rotation of the disks. FIG. 2B is a side view illustrating the actuator device of FIGS. 1 and 2A, and FIG. 2C is a sectional view according to sectional line II—II of FIG. 2B. As shown in the sectional view of FIG. 2C, actuator arm 35 is rectangular, thus, air flow 31, generated on a surface of disks 36, affects the body of actuator arm 35.

Accordingly, in a conventional hard disk drive, when head 42 of actuator 38 is moved to read or write data on disk 36, while the disk 36 is rotated by the spindle motor 33 at the certain speed, the actuator arm 35 is vibrated by air flow 31. In other words, air flow 31 operates as a disturbance upon actuator 38, thereby disturbing a servo system of hard disk drive 1. Here, the disturbance is a windage generated by wind power on actuator arm 35, and a change in the wind power is generated by a turbulent flow at a back portion and a front portion of actuator arm 35. By such disturbance of the servo system, there has been a problem in which it is difficult to control the position of head 42 of actuator 38 on the disk 36, thereby reducing the performance of hard disk drive 1.

Figure 3:
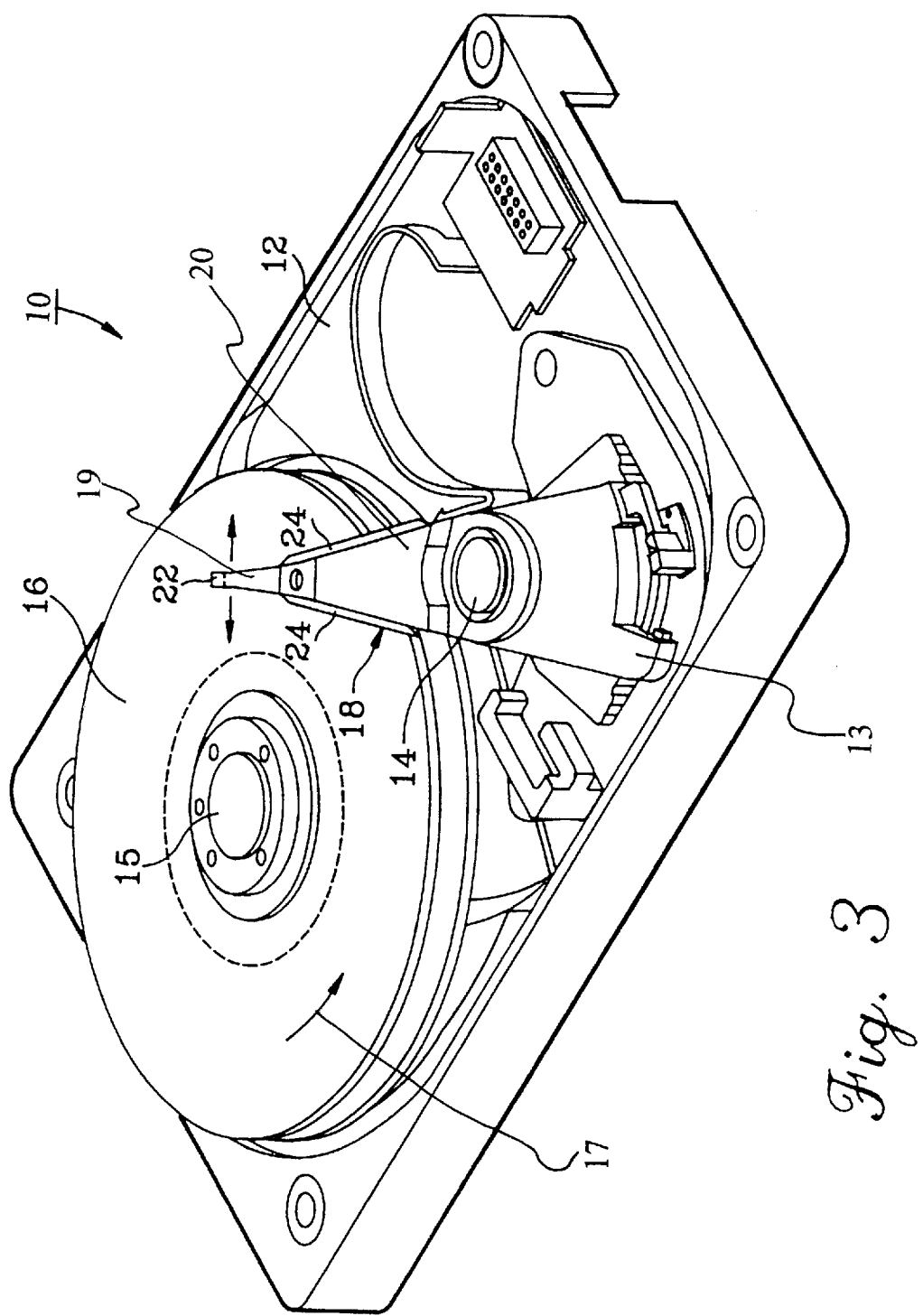
FIG. 3 is a perspective view illustrating an actuator device of a hard disk drive constructed according to the principles of the present invention.

FIG. 3 is a perspective view illustrating an actuator device of a hard disk drive 10 according to the present invention, and FIG. 4 is a perspective view partially illustrating the actuator device of hard disk drive 10 according to the present invention.

Referring to FIGS. 3 and 4, hard disk drive 10 is constructed with a generally, rectangularly shaped base 12 serving as a frame providing a major interior surface accommodating a plurality of circular disks 16 coaxially mounted in a stack upon a spindle 15 driven by a motor (not shown) mounted on base 12 to provide a plurality of cylindrical base surfaces that serve as a memory on which binary information may be written and read. An actuator 18, mounted upon base 12 by a pivot 14, freely rotates about the longitudinal axis of pivot 14 as controlled by a voice coil motor 13 positioned to respond to electrical control signals and thereby arcuately displace a proximal end of actuator arm 20. Actuator arm 20 supports a head gimbal 19 at its distal end which, in turn, supports a plurality of electromagnetic transducers commonly known as read/write actuator heads 22 for reading and writing data on disks 16. Typically, the base surfaces of disks 16 are coated with a magnetically sensitive material that responds to fields created by corresponding ones of actuator heads 22, to enable actuator heads 22 to either write bits of information at selected locations along tracks formed on the surface of disk 16, or to read information from those tracks. Generally, disk 16 continuously rotates in a single direction while voice coil motor 13 acts upon the proximal end of actuator arm 20 to arcuately displace the proximal end relative to motor 13 and thereby cause the distal ends of actuator arm 20 to radially position heads 22 along corresponding base surfaces of disks 16 to read or write data thereto.

Voice coil motor 13 drives the proximal end of actuator arm 20 to move heads 22 to a data free parking or landing zone of disks 16 upon which heads may rest without destroying information stored on disks, 16 when electrical power is turned off. Typically, actuator arm 20 quickly moves heads 22 to the parking zone in case of error or loss of power, and generally a crash stop is provided to block the proximal end and thereby limit further movement of actuator arm 20 once heads 22 reach their stop position within the parking zone.

As shown in FIG. 3 and FIG. 5, hard disk drive 10 is provided with a spindle motor 15, assembled to base 12, which rotates at a certain speed, and disk 16 is rotated as a recording medium by spindle motor 15. Actuator heads 22 "fly" over the corresponding surfaces of disks 16, and are normally spaced apart from those surfaces by a hydrodynamic air bearing formed by a cushion of air 17 generated by the rapid rotation of disks 16.

Actuator arm 20 of actuator 18 has at least one and preferably two guiding units 24 attached thereto. Guiding units 24 are formed in a streamline, or tapered, shape, and are attached to the windward and leeward side of actuator arm 20, as shown in FIG. 5A, or one guiding unit 24 is attached to the leeward side of actuator arm 18, as shown in FIG. 5B, in order to cause air flow 17 to have a laminar flow between disk 16 and actuator arm 20.

In further detail, FIG. 4 is the perspective view illustrating the actuator device of hard disk drive 10 for reducing a disturbance affecting actuator 18 by an air flow 17. Guiding unit 24 is shown having a tapered or wedge shape and is attached to actuator arm 20 between the gimbal end of actuator arm 20 and the body of actuator 18. Additionally the width of actuator arm 20 is covered by guiding unit 24. In other words, guiding unit 24 completely covers at least the leeward side portion, FIG. 5B, of actuator arm 20, and preferably covers both the leeward side and the windward side portion, FIG. 5A, of actuator arm 20. Guiding unit 24, made as a separate part, is attached to actuator arm 20 by an adhesive or other known attaching methods. Accordingly, guiding unit 24 can be made by a cutting process or can be made by an injection molding process. Further, guide unit 24 is composed of a light weight material, such as plastic, aluminum or of the same material forming actuator 18.

When a power supply is applied to hard disk drive 10, disk 16 is rotated by spindle motor 15 at a certain speed. At this time, air flow 17 is generated on the surface of disk 16, so that head 22 is caused to fly above the surface of disk 16 by the generated air flow 17. Additionally, head 22 is moved to an object track of disk 16 in order to read or write data on the object track. At this time, as shown in FIG. 5, air flow 17, generated from the surface of disk 16, is guided along guiding unit 24. In other words, the generated air flow 17 is steered by guiding unit 24 instead of colliding with actuator arm 20. According guiding unit 24 directs the air into a laminar air flow. Accordingly, the disturbance acting upon actuator 18 by air flow 17 is reduced.

Figure 5A:
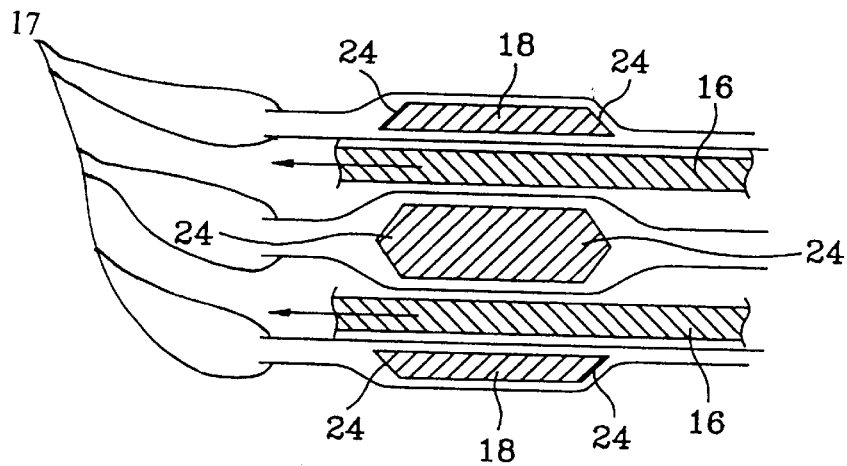
FIG. 5A and 5B are sectional views illustrating an air flow state between a disk and an actuator arm constructed according to the principles of the present invention.
Figure 5B:
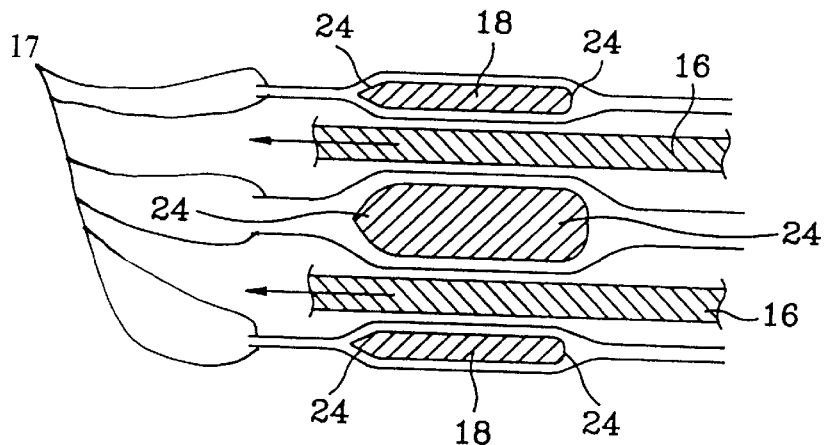
Figure 6:
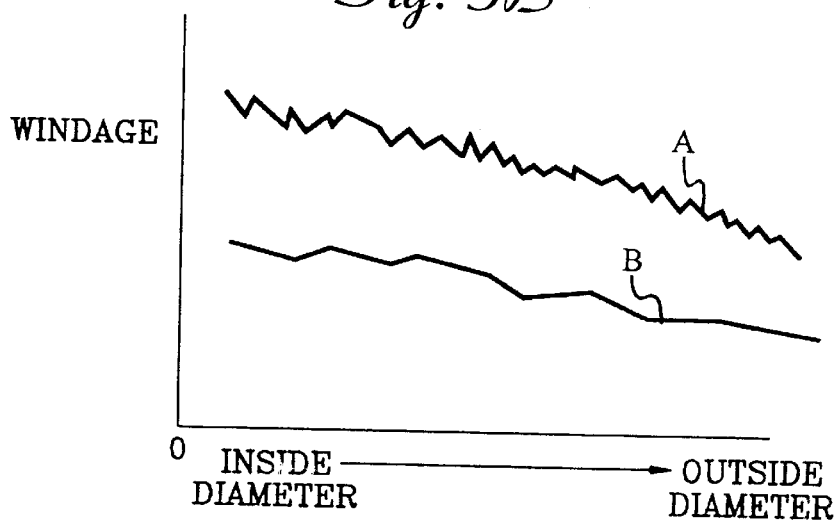
FIG. 6 is a graph diagram comparing an effect of an actuator device of a hard disk drive constructed according to the principles of the present invention with the effect of a conventional actuator device of a hard disk drive.

FIG. 6 is a graph diagram comparing an effect of an actuator device of a hard disk drive according to the principles of the present invention, with respect to FIG. 5A, with the effect of the conventional actuator device of the hard disk drive shown in FIG. 1. As shown in FIG. 6, graph line A represents the vibrations affecting the actuator of the conventional hard disk drive, whereas graph line B represents the vibrations affecting the actuator of the present invention. Consequently, the actuator of the present invention is less affected by a wind disturbance than that of the conventional hard disk drive, thereby improving a servo function, and accordingly, improving the reliability of hard disk drive 10.

As discussed above, the actuator device of the hard disk drive according to the present invention reduces the disturbance affecting the actuator, which is caused by the air flow generated from the disk at the time of disk rotation, thereby improving a seek time and a stability of a magnetic signal of the head for reading or writing data on the disk.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A hard disk device comprising:

a disk a spindle for rotating said disk at a predetermined speed;

actuator means for positioned an actuator head over an object track of said disk; and guide means attached to said actuator means for guiding an air flow generated on a surface of said disk during rotation of said disk by said spindle into a substantially laminar flow.

2. The hard disk drive as set for in claim 1, further comprising:

a head gimbal for supporting said actuator head;

said actuator means having an actuator arm for supporting said head gimbal; and said guide means being attached to said actuator arm.

3. The hard disk drive as set forth in claim 2, said guide means comprising:

a first guide unit attached to a windward side of said actuator arm; and a second guide unit attached to a leeward side of said actuator arm.

4. The hard disk drive as set forth in claim 2, said guide means comprising:

a guide unit attached to a leeward side of said actuator arm.

5. The hard disk drive as set forth in claim 4, further comprising:

said first guide unit being formed in a wedged shape and concealing said windward side of said actuator arm; and said second guide unit being formed in a wedged shape and concealing said leeward side of said actuator arm.

6. The hard disk drive as set forth in claim 4, further comprising:

said guide unit being formed in a wedged shape and concealing said leeward side of said actuator arm.

7. The hard disk drive as set forth in claim 2, said guide means being formed in a wedged shape and concealing at side portion of said actuator arm.

8. The hard disk drive as set forth in claim 1, said guide means comprising:

a first guide unit attached to a windward side of said actuator means; and a second guide unit attached to a leeward side of said actuator means.

9. The hard disk drive as set forth in claim 1, said guide means being comprised of a light weight material formed in a streamlined shape.

10. The hard disk drive as set forth in claim 1, said guide means being comprised of a light weight material formed in a wedged shape.

11. A hard disk device comprising:

a disk a spindle for rotating said disk at a predetermined speed;

actuator means comprising:
      a head gimbal for supporting an actuator head;
      an actuator arm for supporting said head gimbal; and
      a voice coil motor for positioned said actuator head over an object track of said disk; and guide means attached to said actuator arm for guiding an air flow generated on a surface of said disk during rotation of said disk by said spindle into a laminar flow.

12. The hard disk drive as set forth in claim 11, said guide means comprising:

a first guide unit attached to a windward side of said actuator arm; and a second guide unit attached to a leeward side of said actuator arm.

13. The hard disk drive as set forth in claim 12, further comprising:

said first guide unit being formed in a tapered shape and concealing said windward side of said actuator arm; and said second guide unit being formed in a tapered shape and concealing said leeward side of said actuator arm.

14. The hard disk drive as set forth in claim 11, said guide means comprising:

a guide unit attached to a leeward side of said actuator arm.

15. The hard disk drive as set forth in claim 14, further comprising:

said guide unit being formed in a tapered shape and concealing said leeward side of said actuator arm.

16. The hard disk drive as set forth in claim 11, said guide means being comprised of a light weight material formed in a streamlined shape.

17. The hard disk drive as set forth in claim 11, said guide means being comprised of a light weight material formed in a tapered shape.

18. A method for controlling air flow between a disk and an actuator arm, said method comprising the steps of:

forming a guide unit having a streamlined shape; positioned to travel above a flat surface of a disk interacting with an actuator head carried by said actuator arm to store digital data on the flat surface;

attaching said guide unit to at least one side portion of said actuator arm;

rotating a disk to generate an air flow for enabling a head to fly above said disk;

guiding said air flow into a laminar flow of air by use of said guide unit.

19. The method as set forth in claim 18, said attaching step being further comprised of the step of:

attaching said guide unit to a leeward side of said actuator arm.

20. The method as set forth in claim 18, said attaching step being further comprised of the step of:

attaching a first guide unit to a leeward side of said actuator arm; and attaching a second guide unit to a windward side of said actuator arm.

* * * * *